United States Patent

[11] 3,594,905

| [72] | Inventor | Otto Kretschmer<br>Steinhein am Main, Germany |
| --- | --- | --- |
| [21] | Appl. No. | 699,964 |
| [22] | Filed | Jan. 23, 1968 |
| [45] | Patented | July 27, 1971 |
| [73] | Assignee | Messer Griesheim GmbH<br>Frankfurt am Main, Germany |
| [32] | Priority | Jan. 26, 1967 |
| [33] | | Germany |
| [31] | | M72545 |

[54] COPYING DEVICE FOR CUTTING MACHINES
14 Claims, 3 Drawing Figs.

[52] U.S. Cl. ..................................... 33/23,
90/62
[51] Int. Cl. ..................................... B23q 35/48,
B23q 35/128

[50] Field of Search ............................................. 250/202;
33/23; 90/62; 266/23

[56] References Cited
UNITED STATES PATENTS

| 3,017,552 | 1/1962 | Brouwer ........................ | 250/202 X |
| --- | --- | --- | --- |
| 3,037,888 | 6/1962 | Lobosco et al. ............... | 250/202 X |
| 3,135,904 | 6/1964 | Purkhiser ....................... | 250/202 X |

Primary Examiner—Harry N. Haroian
Attorney—Connolly and Hutz

ABSTRACT: A copying device for machine tools, such as flame and plasma machines, wherein the tool movement is controlled by a preset scanning device which tracks the lines or edges and which has a forward stroke normal to the tool movement is characterized by having the forward stroke of the scanning device adjustable in accordance with the cutting speed of the tool.

PATENTED JUL 27 1971 SHEET 1 OF 2 3,594,905

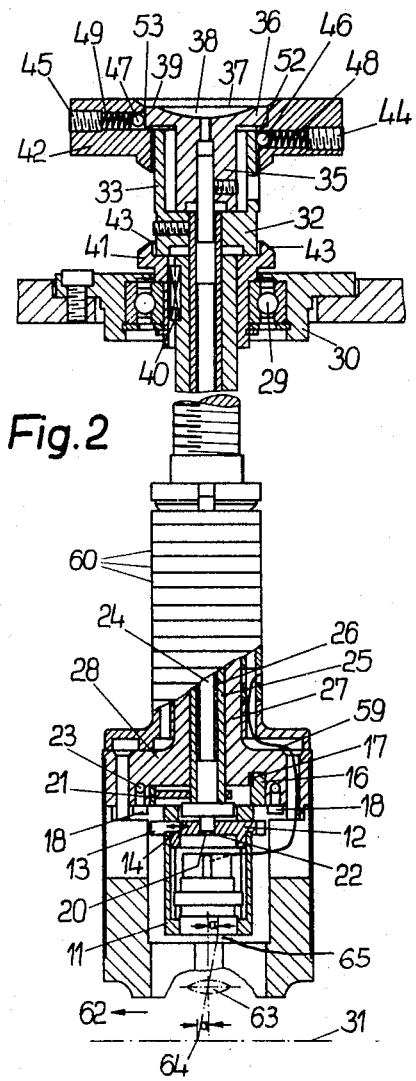
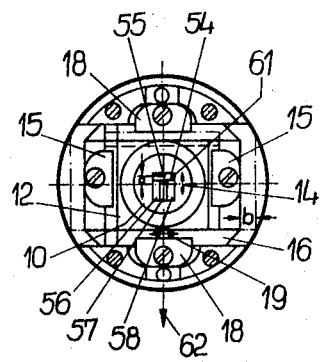
Fig. 2
Fig. 3 sed # COPYING DEVICE FOR CUTTING MACHINES

BACKGROUND OF THE INVENTION

It is known to guide flame cutting machines by photoelectric cells which scan a preset line and report direction changes of this line to an adjusting mechanism by means of a transmitting device, the adjusting mechanism then adapting the movement of the cutting torch to the course of the line and at the same time resetting of the photoelectric cell on the line. Transmitting devices and adjusting mechanisms now have a relatively slight, yet not entirely avoidable, sluggishness, i.e. for the conversion of the impulses emitted by he photoelectric cell to movements of the cutting torch or the photoelectric cell, a certain time period is required. Since the machine operates at a certain cutting speed, however, such sluggishness can lead to undesired deviations of the slide from the pattern.

Previously, one was aided in that the photoelectric cell is given a constant lead of about 1 mm. as compared to the cutting tool. For cutting speeds of about 600 to 1,200 mm./min., as was customary in flame cutting machines, this was entirely sufficient. Particularly because of the development of the plasma cutting process, however, cutting speeds of up to 6,000 mm./min. have now become possible. It has been shown that such high cutting speeds, despite a certain lead of the photoelectric cell, still give unsatisfactory cutting results.

SUMMARY OF THE INVENTION

The object of the invention is to provide a copying device of the initially named type which completely satisfies the high demands of machine tools, particularly flame or plasma cutting machines, with regard to operating precision even at high processing advances. For the solution of this problem it is proposed by the invention that the lead of the scanning device be adjusted in accordance with the height of the processing lead, or the cutting speed of the tool.

The individual lead values can be experimentally determined depending on the processing advance of the cutting speed of a flame cutting machine, for example, and recorded in tables, so that the operator of a flame cutting machine, for example, can manually adjust the particular forward stroke of the scanning device for each cutting speed. It is furthermore possible to coordinate the adjustment of the forward stroke to the adjustment of the cutting speed in such a manner that with the cutting speed the operator also simultaneously adjusts the forward stroke with one and the same operating button. Finally, in this sense an automatic forward stroke adjustment is also feasible, with respect, for example, to machines with cutting speed automatically controlled by the pattern.

A special advantage of the novel copying device is that it can be effectively used both for flame cutting machines of conventional design as well as for modern plasma cutting equipment.

For the practical realization of the inventive thought it is proposed, preferably because of manufacturing reasons, that the scanning device be arranged on a slidable skid serving as forward stroke adjustment.

The movement of the skid can occur in a variety of ways. For example, it is feasible to move the skid by means of a worm gear spindle. However, it is preferred according to the invention, because of reasons explained in more detail below, that the skid be movable by means of a cam which is attached to a shaft.

In each case it is suitable to employ a shaft for the moving of the slide, since great reductions can be achieved thereby in a simple manner. It is furthermore recommended to attach a scale for the forward stroke adjustment at the control device. Even for this the inventive camshaft is particularly well suited.

The movement of the slide by a cam advantageously further makes possible an arrangement of the control device for the slide, namely the camshaft, vertical or perpendicular to the movement direction of the slide. This proves to be particularly advantageous for the case where the copying device is provided with a turning device, which aligns the scanning device with the line or edge to be scanned. Such a turning device is indispensable in the arrangement of a photoelectric cell must always be aligned axially symmetrically with the line to be scanned. Deviations from this symmetry would immediately trigger undesired cross movements of the working tools or would bring the machine to a standstill.

In the event that a turning device is provided for the scanning device, it is inventively proposed, utilizing the above-described advantageous position of the camshaft, that the guideway for the slide be arranged at the end of a hollow shaft serving as a turning device, which concentrically surrounds the camshaft and is rotatably supported at the machine tool housing.

The hollow shaft is suitably inclosed by a housing of light metal, for example, which at the same time encloses further control members such as light source with the indicator for a photoelectric control as well as sliding contacts and the like.

In the event that an adjusting device of the scanning device is provided at right angles to the processing direction of the machine tool, for example a cutting nozzle adjustment at a flame cutting machine, it is suitable to arrange this cross adjustment also in the above-named housing. In addition, as a further advantageous development of the invention it is proposed to coordinate spacewise the cross adjustment and the lead adjustment to each other in such a manner that the scanning device is arranged at a cross-slide guideway effecting both the cross adjustment as well as the forward adjustment thereof.

For instance, in a flame cutting machine, in order not to impair a lead adjustment once undertaken by a cutting nozzle adjustment, it is further proposed that both slides of the cross-slide guideway are movable independently of each other, and namely by a cam arranged on a shaft each.

An independent movability of both slides of the cross-slide guideway is achieved in a simple and advantageous manner in that each cam engages in a slot at each slide, whereby the width of the slide corresponds to about the cam diameter.

A further inventive proposal for the spacewise coordination of the cross adjustment and forward adjustment, where at the same time considerable constructive space is saved, is characterized in that both camshafts are arranged concentrically, one camshaft being arranged within the other camshaft, which in turn is constructed as a hollow shaft.

Since in flame cutting machines, a cross adjustment, for example—in this instance a cutting nozzle adjustment—°—occurs much more often than a forward adjustment, it is suitable that the outer camshaft, shaped as a hollow shaft, serve for the cross adjustment of the scanning device and is manually turnable at its circumference.

For the turnability of the outer camshaft it is proposed that it be provided with a milled edge at an easily accessible part of its circumference, such as at the upper end protruding from the housing. Below this milled edge, a scale is arranged at the camshaft which allows a bilateral exact cross adjustment.

The inner camshaft serves thus for the less frequently required forward adjustment. Its turnability need not occur so easily, therefore, as the turnability of the outer camshaft effecting the cross adjustment. In particular, it is inventively proposed in this regard that the inner camshaft at its end turned away from the scanning device have a collar which overlaps the end of the outer camshaft, and that the inner camshaft be turnably constructed at the frontal surface of the collar.

The frontal surface of the collar is suitably provided with a slot for the engagement of a screwdriver or the like. The edge of the frontal surface is well suited for attaching the scale for the forward adjustment.

In the event that that machine tool—as already described above —is provided with a turning device which aligns the scanning device according to the line or edge to be scanned, it is inventively proposed that both camshafts be surrounded by a hollow shaft, serving as the turning device, which is rotatably supported at the machine tool housing.

Since the camshaft for the activation of the forward adjustment is arranged within the camshaft for the cross adjustment, it is recommended that the guideway for the slide serving for the cross adjustment of the scanning device be arranged on the turning device hollow shaft, and the guideway for the slide serving for forward stroke adjustment be arranged at the slide serving for cross adjustment.

In order to prevent, during activation of the turning device, a change of the adjusted forward or cross adjustment values, it is proposed that both camshafts be connected by a detachable linkage with the turning device, and thereby also be turnably connected together.

The detachable connection of both camshafts with the hollow shaft of the turning device can take place in any desired manner, for example directly. However, inventively an embodiment is preferred which is characterized by a connecting member having a stop device, which is coupled with the outer camshaft, and a further stop device, which is coupled with the inner camshaft.

The stop devices are suitable designed so that they can easily be overcome by a certain torque applied by hand. A forward or cross adjustment, independent of each other, can advantageously occur in that the above-named connecting member is secured by hand and the respective camshaft is activated with the other hand.

The construction of the inventive connecting element is basically arbitrary. Since in the forward or cross adjustment it should be locked by hand, as already indicated above, it is suitable to provide as the connecting member a handwheel concentrically surrounding both camshafts and turnably connected with the hollow shaft.

Such a handwheel enables at the same time also the activation of the turning device by hand, say in the event that automatic control fails. Of course both stop devices must withstand the relatively slight torque then setting in.

With respect to the arrangement and construction of the stop devices, it is proposed as particularly advantageous because of production and service grounds that in radial borings in the handwheel there be arranged as the stop device ball bearings movable against spring force, which engage in a splining or the like at the circumference of the camshaft.

The handwheel is suitable so arranged that the collar overlapping at the end the outer camshaft forms at the end of the inner camshaft the hub of the handwheel.

THE DRAWINGS

FIG. 1 shows a copying arrangement, partially in cross section, and partially in top view;
FIG. 2 is a sectional view along the line II–II of FIG. 1; and
FIG. 3 shows a view in the direction of arrow A in FIG. 1.

DETAILED DESCRIPTION

Figure 1:
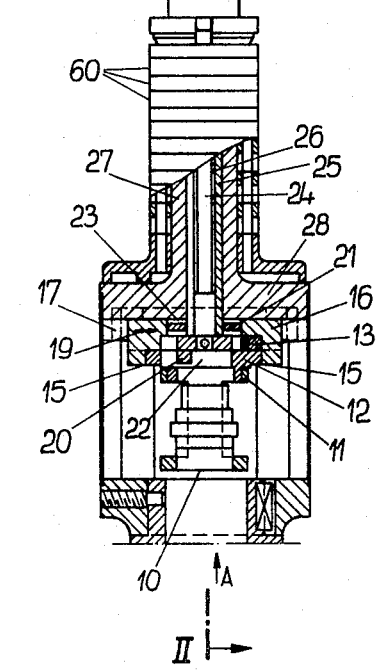

According to the drawing, a photoelectric cell, as the scanning device for a preset line or edge (not shown) designated by 10 is attached at a mounting 11 above a pattern surface indicated by dotted line 31 (FIG. 2). Mounting 11 is a part of a slide 12, which is movably arranged in a guideway 13 in the direction of arrow 14. Slide 12 is prevented from falling out by plates 15.

The guideway 13 is arranged in a further slide 16, which in turn in conducted in a guideway 17 and secured against falling out by plates 18. The movement direction of the slide 16 is indicated by arrow 19 in FIGS. 1 and 3. It runs vertical (i.e. normal) to the movement direction of slide 12. Both slides 12 and 16 are movable independently of each other and form a so-called cross-slide guideway. This cross-slide guideway enables an operation of the photoelectric cell 10 in any desired direction within a plane parallel to the pattern surface 31. The movement of slides 12 or 16 occurs by a cam 20 or 21. Cams 20, 21 are engaged, respectively in a slot 22 or 23, whose width corresponds to the respective cam diameter. The cam 21 serving for the movement of slide 16 is disc shaped, while cam 20 has a cone shape.

The above-mentioned independent movement of both slides 12, 16 is afforded by the longitudinal expansion of slots 22, 23.

The cams are mounted on a camshaft 24 or 25, which serve for the activation of the particular cam by rotation at their longitudinal axis. Camshaft 24 for the movement of slide 12 passes through the camshaft 25 in a longitudinal recess 26. Camshafts 24, 25 are in turn arranged within a hollow shaft 27, which at its lower enlarged end 28 contains guideway 17 for slide 16. At its upper area, the hollow shaft 27 is turnably supported by means of ball bearing 29 at a support member 30 which is fixed to the machine tool housing (not shown).

Above bearing 29 of hollow shaft 27, the outer camshaft 25 is continued in a tube part 32, which is provided at the circumference with a milled edge 33, which in turn serves for the manual activation of camshaft 25. A scale 34 below the milled edge 33 shows the respective rotation values of the camshaft 25.

The inner camshaft 24 is continued in an end piece 35 which overlaps with collar 36 the upper edge of the tube part 32. A revolution of the inner camshaft 24 occurs at the frontal surface 37 of end piece 35, which there has for this purpose a slot 38 for the insertion of a screwdriver or the like. A scale at the edge 39 of frontal surface 37 indicates the revolution rate of the inner camshaft 24.

Hollow shaft 27 is connected at bearing 29 by an adjusting spring 40 with a tube 41, which is shaped as a casting and where at the upper end, a handwheel 42 is arranged. Tube 41 has two recesses 43 for milled edge 33 and scale 34.

Handwheel 42 or tube 41 serves for the rotation of hollow shaft 7 together with both camshafts and thus also with photoelectric cell 10. Such a rotation of the hollow shaft is intended for the aligning of the photoelectric cell opposite the traced line serving as a pattern and is then required when traced line changes over from straight into curved areas—or vice versa.

In order to achieve by rotation of hollow shaft 27 also a corresponding rotation of the photoelectric cell 10, hollow shaft 27 must be coupled with both camshafts 24, 25. For this there are provided two stop devices 44, 45 which consist of a ball bearing 46 or 47 and a pressure spring 48 or 49 which in turn engage in the serrations 52 or 53 at the circumference of tube member 32 or end piece 35.

FIG. 3 illustrates the operation of the photoelectric cell 10. Photoelectric cell 10 essentially consists of a divided differential resistor 54 which exerts the actual control function along the line traced on the pattern. In this connection, the point of the traced line is picked up by the photoelectric cell, the point being located directly under the center point 55 of the differential resistor 54. Three further resistors, designated with 56 to 58, serve for the control of the machine advance, for example in flame cutting machines, of the decrease in cutting speed in cutting of corners.

The information delivered by the photoelectric cell is transmitted by electrical conductors, of which one is shown in FIG. 2 and designated by 59, to sliding rings 60, from where it is taken up by brushes (not shown) and transmitted to the adjusting mechanism of the machine tool (also not shown) which then corrects the processing direction of the tools accordingly, and also adapts the movement direction of the photoelectric cell 10 again to the course of the traced line.

Since presently the processing speed in flame cutting machines, especially in plasma cutting machines, is very high (up to 6 m./min.) and from the time of the formation transmittance of the photoelectric cell to the corresponding reaction of the adjusting mechanism, a certain amount of time goes by of course, it is necessary to allow the photoelectric cell a certain lead opposite the tool—where point 55 of the differential resistor 54 is decisive. Assuming that the tool, for example a plasma cutting torch, is located at a point corresponding to point 61 (FIG. 3) there results according to FIG. 3 a lead designated by *a* of the differential resistor 54 as compared to the tool. The processing direction of the machine is indicated by an arrow designated by 62. It should be taken into account in lead *a*, which actually would be a return motion according to the drawing, that between pattern surface 31 and photoelectric cell there is interposed a lens 63 (see FIG. 2) which effects a specular inversion of the traced line. The operation of lens 63 is shown in FIG. 2: A point 64 on the traced line is reproduced through lens 63 at point 65 of the photoelectric cell. If point 64 thus is at lead amount *a* before the center axis of the tool, for example of a cutting torch, the differential resistor 54 of the photoelectric cell must be located at the point designated by 65.

If the movement direction of the machine (arrow 62) is compared with the movement direction of slide 12 (arrow 14), it can easily be seen that slide 12—activated by camshaft 25 or by end piece 35—serves for the adjustment of the above-described lead. It is suitable to have in flame or plasma cutting machines an adjustment of the lead about between 1 and 4 mm., depending on the cutting speed. The scale at edge 39 of end piece 35 should be calibrated accordingly.

From a comparison of the movement direction of the machine, indicated by arrow 62, with the movement direction of the slide 16 (arrow 19), it can be seen that this serves for the cross adjustment of the photoelectric cell, for example in flame cutting torches for cutting nozzle adjustment. FIG. 3 shows the maximum cross adjustment value to each side and is designated there with *b*.

A cross or forward adjustment, independent of each other, occurs in a simple and advantageous manner by rotating the tube part 32 or the end piece 35, in which case the handwheel 42 is maintained stationary.

What I claim is:

1. A copying device for a cutting tool wherein the movement of the tool is controlled by a preset scanning device which has a forward stroke in the direction of the tool movement, characterized in means for adjusting said forward stroke in accordance with the tool-cutting speed, said means includes a movable slide, said scanning device being arranged on said movable slide, a tool housing, a hollow shaft rotatably supported on said housing, a camshaft concentrically arranged in said hollow shaft, a guideway at the end of said hollow shaft, and said slide being movably mounted in said guideway.

2. A copying device for a cutting tool wherein the movement of the tool is controlled by a preset scanning device which has a forward stroke in the direction of the tool movement, characterized in means for adjusting said forward stroke in accordance with the tool cutting speed, said means including cross slide guideway means for effecting both cross and forward adjustment of said scanning device, said cross slide guideway means including a pair of slides, and displacing means for displacing said slides independently of each other.

3. A device as set forth in claim 2 wherein said displacing means is in the form of cam means.

4. A device as set forth in claim 3 wherein said cam means includes a pair of cams mounted on respective camshafts, each of said slides having a slot, each of said cams being engaged in a respective slot, and the width of each slot corresponding to the diameter of its respective cam.

5. A device as set forth in claim 4 wherein said camshafts include a hollow camshaft and a second inner camshaft concentrically disposed in said hollow camshaft.

6. A device as set forth in claim 5 wherein said hollow camshaft is manually rotatable to effect the cross adjustment of said scanning device.

7. A device as set forth in claim 6 wherein a collar is mounted on aid inner camshaft remote from said scanning device, and said collar overlapping the end of said hollow camshaft to provide a means for rotating said inner camshaft.

8. A device as set forth in claim 4 including turning means for aligning said scanning device in accordance with the line to be scanned, said turning means including an outer tubular shaft, said camshafts being disposed in said tubular shaft, a tool housing, and said tubular shaft being rotatably supported by said tool housing.

9. A device as set forth in claim 8 wherein each of said slides is mounted in one of a respective pair of guides, one of said guides serving for the cross adjustment of said scanning device and being arranged on said tubular shaft, the other of said guides serving for the forward stroke adjustment of said scanning device and being arranged at the slide of said cross adjustment guide.

10. A device as set forth in claim 9 wherein a detachable linkage connects said camshafts to said tubular shaft for mutual rotation therewith.

11. A device as set forth in claim 10 wherein said camshafts include a first hollow camshaft and a second inner camshaft concentrically disposed therein, a connecting member having a first stop device coupled with said hollow camshaft, and a further stop device coupled with said inner camshaft.

12. A device as set forth in claim 11 wherein said connecting member is a handwheel concentrically arranged around said camshafts and rotatably connected with said tubular shaft.

13. In a device as set forth in claim 12 wherein radial borings are in said handwheel, said first stop device including ball bearings in said borings movable against spring force, said bearings engaging in splinings at the circumference of one of said camshafts.

14. In a device as set forth in claim 12 wherein said collar forms the hub of said handwheel at the end of said inner camshaft.